(12) United States Patent
Muramatsu et al.

(10) Patent No.: US 6,715,596 B2
(45) Date of Patent: Apr. 6, 2004

(54) ONE-WAY CLUTCH FOR AUTOMATIC TRANSMISSION

(75) Inventors: Kazuhiko Muramatsu, Fukuroi (JP); Nobuhiro Horiuchi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/125,455

(22) Filed: Apr. 19, 2002

(65) Prior Publication Data

US 2002/0153218 A1 Oct. 24, 2002

(30) Foreign Application Priority Data

Apr. 20, 2001 (JP) .................................... 2001-122764

(51) Int. Cl.[7] .............................................. F16D 41/12
(52) U.S. Cl. ...................... 192/46; 192/219.2; 188/82.7
(58) Field of Search ..................... 192/219.2, 219.3, 192/223.1, 46; 188/82.7

(56) References Cited

U.S. PATENT DOCUMENTS

| | | | |
|---|---|---|---|
| 1,262,901 A | * 4/1918 | Allen | 192/219.2 |
| 1,720,340 A | * 7/1929 | Moran | 192/219.2 |
| 2,070,698 A | * 2/1937 | Tinghir | 192/219.3 |
| 2,272,028 A | * 2/1942 | Wimbush | 192/219.2 |

FOREIGN PATENT DOCUMENTS

JP   55004225 A   * 1/1980   ........... B60K/17/28

* cited by examiner

*Primary Examiner*—Richard M. Lorence
(74) *Attorney, Agent, or Firm*—Miles & Stockbridge, P.C.

(57) ABSTRACT

The present invention provides a one-way clutch for an automatic transmission, comprising an inner race, an outer race disposed in coaxial with the inner race and rotated relative to the inner race, recessed portions formed in an outer periphery of the inner race or an inner periphery of the outer race along a circumferential direction, pawls engaged by the recessed portions, and biasing members for biasing the pawls toward the recessed portions, and wherein the outer race is integrally provided on a case of the automatic transmission.

15 Claims, 6 Drawing Sheets

ONE-WAY CLUTCH FOR AUTOMATIC TRANSMISSION

BACKGROUND OF THE INVENTION

1. Field of the Invention

The present invention relates to a one-way clutch used in an automatic transmission and a method for manufacturing such a one-way clutch.

2. Related Background Art

Figure 7:
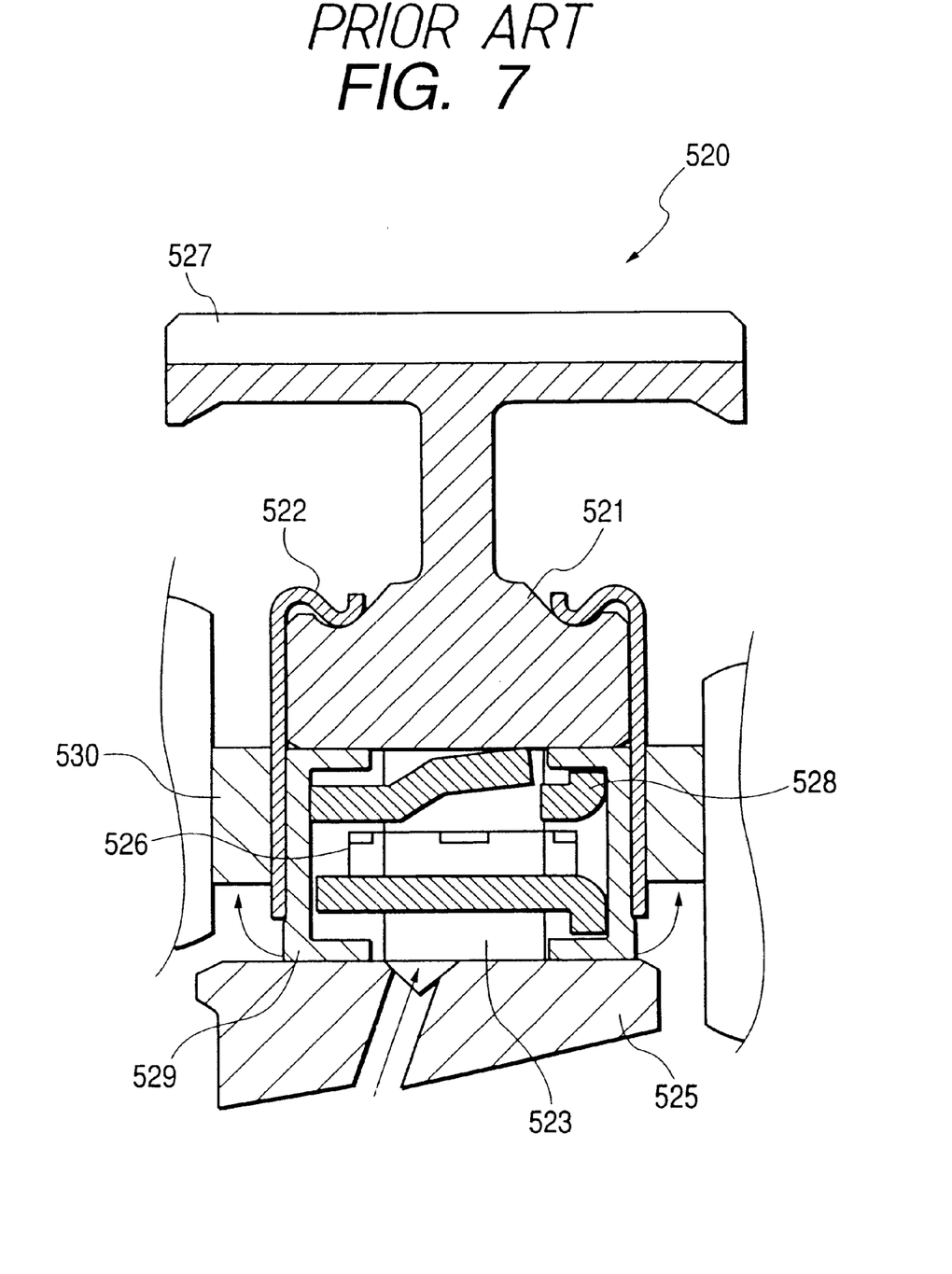
FIG. 7 is an axial sectional view of a conventional one-way clutch assembly.

FIG. 7 shows an example of a conventional one-way clutch assembly. In FIG. 7, in a one-way clutch assembly 520, an outer race 521 is defined by an inner peripheral portion of a cylindrical clutch hub 527, and a sprag 523 is disposed between the outer race 521 and an inner race 525 coaxial with the outer race. There are provided a ribbon spring 526 for biasing the sprag 523 in a radial direction, and an annular holder 528 for holding the sprag 523 and the ribbon spring 526.

At an axial side of the holder 528, an annular end bearing 529 having substantially U-shaped section is disposed between the outer race 521 and the inner race 525, thereby providing a proper clearance within which the sprag 523 can be rocked in a radial direction. Further, a pair of side plates 522 are mounted on axial outer ends of the end bearing 529, thereby regulating an axial movement of the holder 528. Incidentally, thrust washers 530 are disposed between the side plates 522 and opponent members, thereby providing axial positioning.

Further, the inner race 525 is provided with an oil path (shown by the arrow) which is a radial through-hole through which lubricating oil can be supplied in the one-way clutch.

In the one-way clutch of sprag type having the above-mentioned construction, when the inner race 525 is rotated in one direction, the inner race 525 is engaged by the outer race 521 via the sprag 523, thereby transmitting torque of the inner race 525 to the outer race 521. On the other hand, when the inner race 525 is rotated in an opposite direction, the sprag 523 is merely slid on an outer peripheral surface of the inner race 525, with the result that the torque is not transmitted.

In recent years, compactness, reduction of weight and reduction of cost of the automatic transmission have been requested. However, in the conventional construction, since the one-way clutch was merely combined with the automatic transmission, it was difficult to reduce the number of parts.

SUMMARY OF THE INVENTION

Therefore, an object of the present invention is to achieve compactness, reduction in weight, improvement in productivity and reduction in cost regarding an automatic transmission by matching a construction of a one-way clutch with a purpose of usage to meet such requirement.

To achieve the above object, in the present invention, an outer race of a one-way clutch of ratchet type using pawls as torque transmitting members is provided on a case of an automatic transmission. More specifically, the present invention is characterized by a one-way clutch for an automatic transmission, comprising an inner race, an outer race disposed in coaxial with the inner race and rotated relative to the inner race, recessed portions formed in an outer periphery of the inner race or an inner periphery of the outer race along a circumferential direction, pawls engaged by the recessed portions, and biasing members for biasing the pawls toward the recessed portions, and wherein the outer race is provided on a case of the automatic transmission.

Further, in the present invention, the outer race or bush of the one-way clutch may be integrally formed with the case of the automatic transmission.

More specifically, the present invention is characterized by a one-way clutch for an automatic transmission, comprising an inner race, an outer race disposed in coaxial with the inner race and rotated relative to the inner race, torque transmitting members disposed between the inner and outer races and adapted to transmit torque, and biasing members for promoting fitting of the torque transmitting members, and wherein the outer race is integrally formed with a case of the automatic transmission.

Further, the present invention is characterized by a one-way clutch for an automatic transmission, comprising an inner race, an outer race disposed in coaxial with the inner race and rotated relative to the inner race, torque transmitting members disposed between the inner and outer races and adapted to transmit torque, biasing members for promoting fitting of the torque transmitting members, a bush for supporting the torque transmitting members and the biasing members to provide a predetermined clearance between the inner and outer races, and wherein the bush is integrally formed with a case of the automatic transmission.

By the above-mentioned invention, it is not required that the outer race or the bush be provided separately, thereby achieving compactness, reduction in weight and reduction in cost regarding the one-way clutch.

Further, in the present invention, a one-way clutch of ratchet type may be used as the one-way clutch.

Further, the outer race or the bush provided on or formed integrally with the case may be made of aluminium. In this case, reduction in weight of the one-way clutch can be achieved, while maintaining strength.

In the present invention, the outer race or the bush provided on or formed integrally with the case may be obtained by die casting.

In this case, working steps can be simplified in comparison with a case where the outer race is formed separately.

In the present invention, a bearing portion may be provided on the outer race or the bush integrally formed with the case. In this case, not only it is not required that the bearing portion be provided separately to simplify assembling steps, but also reduction in weight and cost can be achieved.

DETAILED DESCRIPTION OF THE PREFERRED EMBODIMENTS

In a preferred embodiment of the present invention, an outer race or a bush of a one-way clutch is formed integrally with a case of an automatic transmission. Attachment of the outer race or bush to the case of the automatic transmission is not particularly limited, but spline fitting, bolt fastening or welding may be used.

Further, it is desirable that the case and the bush or the outer race integrally formed with the case be made of aluminium by die casting. By such integrally forming in this way, the number of parts can be reduced, and working time for working the outer race or the bush can be reduced greatly.

Although members for biasing torque transmitting members are not particularly limited so long as they are elastic bodies, desirably, they are springs, particularly, accordion springs. The reason is that the accordion spring is relatively weak to reduce squeezing torque and has good endurance.

The type of the one-way clutch is not particularly limited, but it is desirable to use a one-way clutch of ratchet type in which pawls are used as the torque transmitting members and the torque is transmitted by engagement between the pawls and recessed portions (notches). The reason is that, even when an outer race of the one-way clutch is made of aluminium, adequate strength can be maintained.

By the way, in the one-way clutch of ratchet type, backlash may become great and engaging noise may be generated. In order to prevent the engaging noise, a damper mechanism for absorbing shock is disposed between the bush and the outer race. For example, although an elastic member such as a spring or rubber may be used as the damper mechanism or a damper of oil closed type may be used, in the illustrated embodiment, a spring, particularly, a coil spring is used.

As well as at least one of the outer race or the bush constituting the one-way clutch, a bearing portion is also provided. In the bearing portion, a bearing such as a rolling bearing having an inner race and an outer race may be provided separately, or, a part of the bearing portion may be formed as a sliding bearing by surface treatment. Further, when the sliding bearing is used, it is desirable that a minute groove is provided in the sliding surface. In the following embodiments, a discrete roller bearing is used.

Now, embodiments of the present invention will be explained with reference to the accompanying drawings. Incidentally, through the drawings, the same elements are designated by the same reference numerals.

Figure 1:
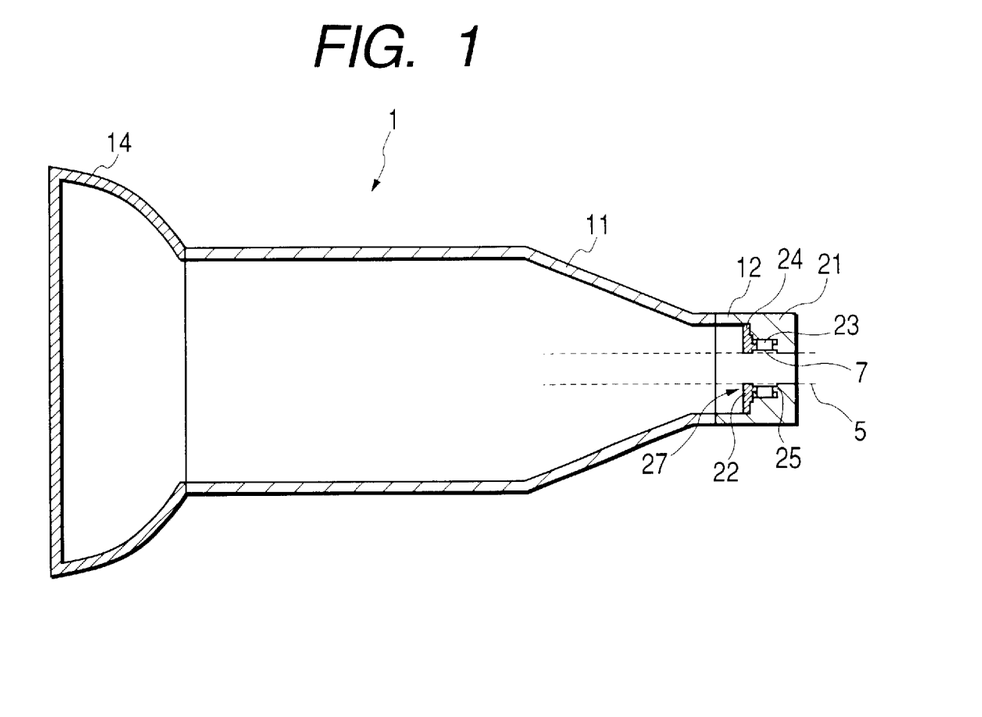
FIG. 1 is an axial sectional view of a one-way clutch according to a first embodiment of the present invention.

FIG. 1 is an axial sectional view of an automatic transmission case 1 into which a one-way clutch according to a first embodiment of the present invention is incorporated. A difference from a conventional one-way clutch of ratchet type is that an outer race 21 of the one-way clutch is provided with an extension 12. Now, a construction will be explained.

In the automatic transmission case 1, a cylindrical torque converter cover 14 for housing a torque converter, a cylindrical body portion 11 for housing a transmission and a cylindrical extension 12 for adjusting an axial dimension of the automatic transmission to match it with an installation portion of a vehicle are arranged in coaxial with each other. Further, a drive shaft 5 (shown by the broken line) extends along a substantially center of the automatic transmission case 1. Incidentally, in FIG. 1, for clarification's sake, the torque converter and the transmission are omitted from illustration.

A one-way clutch 27 of ratchet type according to the first embodiment is disposed within the extension 12. The drive shaft 5 extends through the extension 12, and axial both ends of the extension is opened.

One end (connected to the body portion 11) of the extension 12 has a first inner peripheral surface having substantially the diameter as that of an inner peripheral surface of the body portion. On the other hand, the outer axial end of the extension 12 has a second inner peripheral surface having substantially the same diameter as an outer diameter of the drive shaft 5 to rotatably support the drive shaft 5. Further, the first and second inner peripheral surfaces are interconnected via end faces 24 extending in parallel along a radial direction. Further, in the vicinity of the second inner peripheral surface, there are provided concave pockets opening to the inner periphery and arranged equidistantly along a circumferential direction, and accordion springs (not shown) and torque transmitting members or pawls 23 are housed in the respective pockets.

The pawl 23 disposed in the pocket is rockably supported in the radial direction by regulating axial one end of the pawl by a projection provided in the pocket and the other end by a projection of a flanged bush 22 fitted in the end face 24 of the extension.

Further, the pawl 23 is elastically biased radially inwardly by a spring (not shown) mounted to the extension.

In the one-way clutch 27 of ratchet type as mentioned above, an inner race 25 disposed around the drive shaft 5 is rotated in one direction, since the pawls 23 are biased radially inwardly by elastic forces of the springs, one of the plural pawls 23 is locked by a notch (recessed portion) 7 of the inner race 25. By locking the pawl 23 of the extension 12 by the notch 7 of the inner race 25, torque of the inner race 25 is transmitted to an outer race 21 which is a driven member.

On the other hand, when the inner race 25 is rotated in an opposite direction, since the pawls 23 are not locked by the notches 7, the torque of the inner race 25 is not transmitted to the outer race 21. Thus, only the inner race 25 is idly rotated.

Accordingly, unlike to the conventional one-way clutch of ratchet type, since the outer race is formed on the extension, the one-way clutch of ratchet type can be made compact.

Incidentally, in the first embodiment, while an example that the notches 7 as constructional elements of the one-way clutch are provided in the inner race 25 and the pawls 23 and the biasing members are provided in the extension 12 as the outer race 21 was explained, the notches may be provided in the outer race 21 and the pawls 23 may be provided in the inner race 25.

Figure 2:
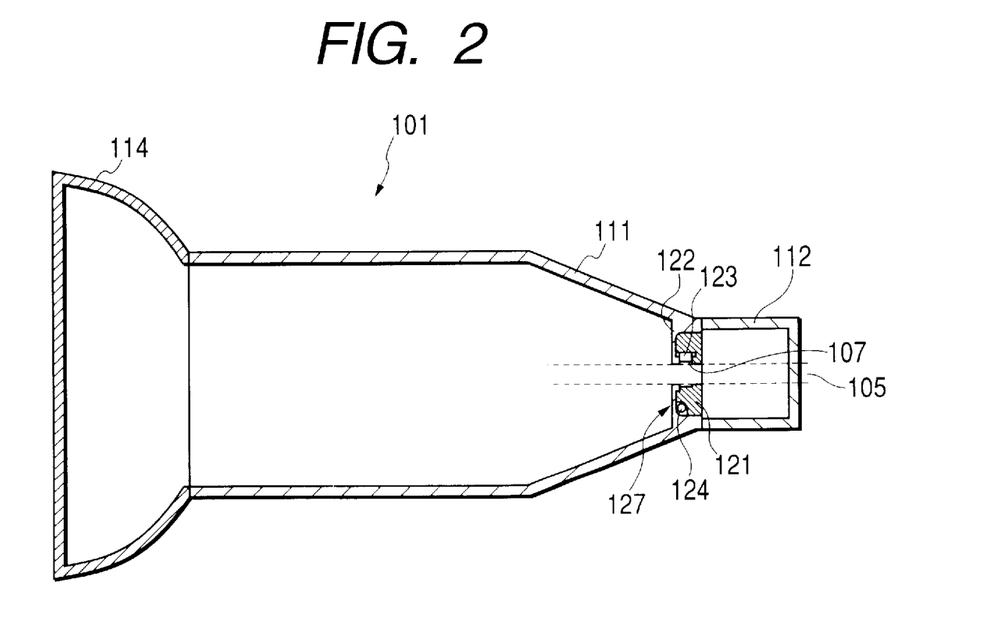
FIG. 2 is an axial sectional view of a one-way clutch according to a second embodiment of the present invention.

FIG. 2 shows an automatic transmission case 101 to which one-way clutch of ratchet type according to a second embodiment of the present invention is applied. The automatic transmission case 101 according to the second embodiment has a construction substantially the same as the automatic transmission case 1 according to the first embodiment and comprises a cylindrical torque converter cover 114 for housing a torque converter, a cylindrical body portion 111 for housing a transmission and a cylindrical extension 112 for adjusting an axial dimension of the automatic transmission to match it with an installation portion of a vehicle. Differences are that the body portion 111 is provided at its right end with an opening through which a drive shaft 105 extends and a bush 122 having U-shape axial section is provided. Namely, a one-way clutch 127 is not provided in the extension 112.

A disk-shape outer race 121 having a configuration complementary to a recessed portion of the bush 122 is mounted in coaxial with the bush 122. The outer race 121 is provided at its inner periphery with a plurality of pockets disposed equidistantly along a circumferential direction, torque transmitting members or pawls 123 rockable in a radial direction and accordion springs 123 (refer to FIG. 3) are disposed within the respective pockets. When the outer race 121 is assembled to the bush 122, the pawls 123 and the accordion springs 126 are supported by the bush 122, thereby preventing dislodgment.

On the other hand, an inner race 125 is disposed around the outer periphery of the drive shaft 105 in coaxial with the latter, and the inner race 125 is provided at its outer peripheral surface with a plurality of notches 107 as recessed portions corresponding to the pockets. Further, a cylindrical member 106 is coaxially fitted into an inner peripheral surface of the inner race 125 (refer to FIG. 4).

Further, a plurality of circumferential cavities 128 (refer to FIG. 4) are provided so that the bush 122 and the outer race 121 can be rotated relative to each other within a predetermined range.

Similar to the first embodiment, in the above-mentioned one-way clutch 127 of ratchet type, when the inner race 125 is rotated in one direction (Y direction in FIG. 3), since the pawls 123 are biased radially inwardly by elastic forces of the springs, one of the plural pawls 123 is locked by the notch 107 of the inner race 125. By engaging the pawl 123 of the outer race 121 by the notch 107, torque of the inner race 125 is transmitted to the outer race 121.

On the other hand, when the inner race 125 is rotated in an opposite direction (X direction in FIG. 3), since the pawls 123 are not engaged by the notches 107, the torque of the inner race 125 is not transmitted to the outer race 121.

Incidentally, in the first and second embodiments, the inner race and the drive shaft are arranged in coaxial with each other to provide a dual structure and are rotated relative to each other. Namely, although rotations of the inner race and the members secured to the inner race are limited to one direction, the drive shaft can be rotated in both directions.

Now, the one-way clutch according to the second embodiment will be explained with reference to FIGS. 3 and 4.

Figure 3:
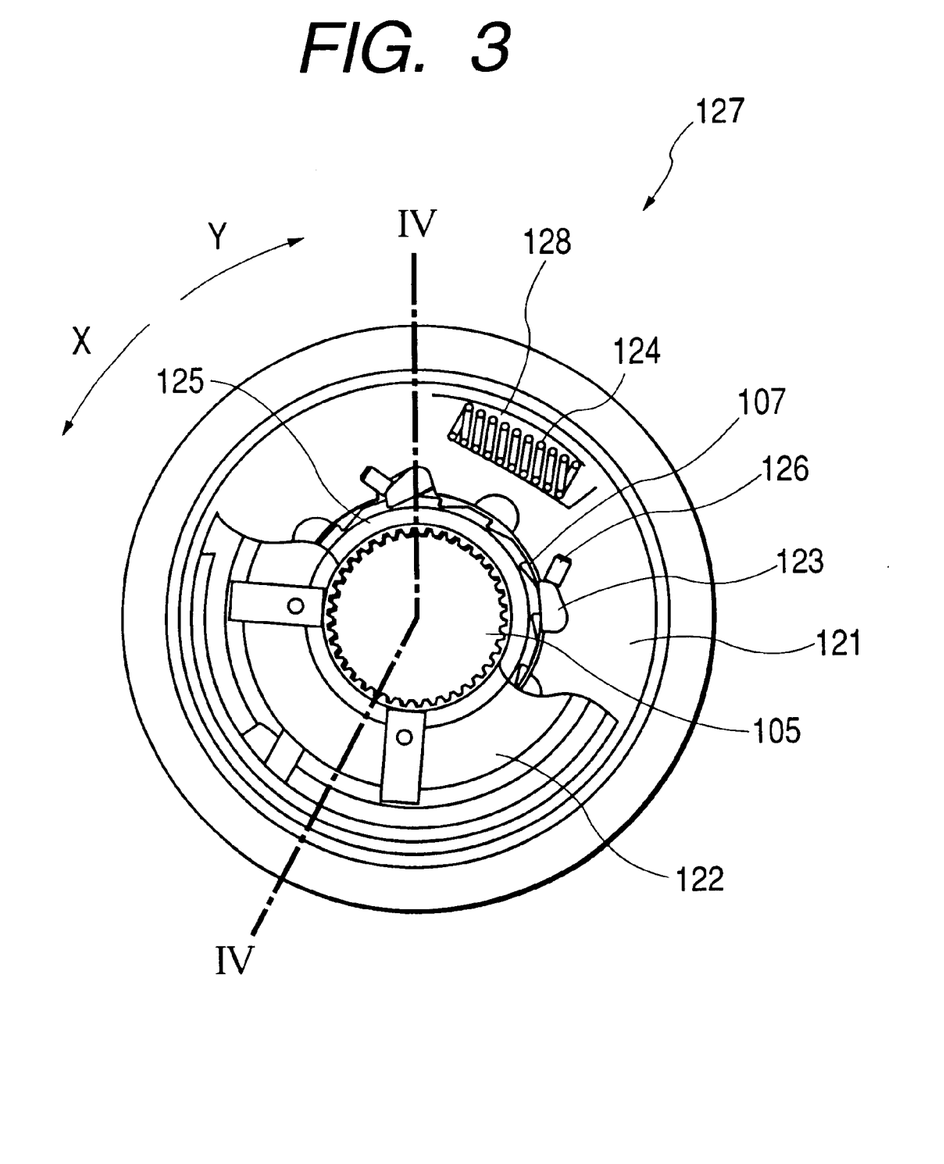
FIG. 3 is a partial fragmental, front view of a ratchet type one-way clutch portion of FIG. 2.
Figure 4:
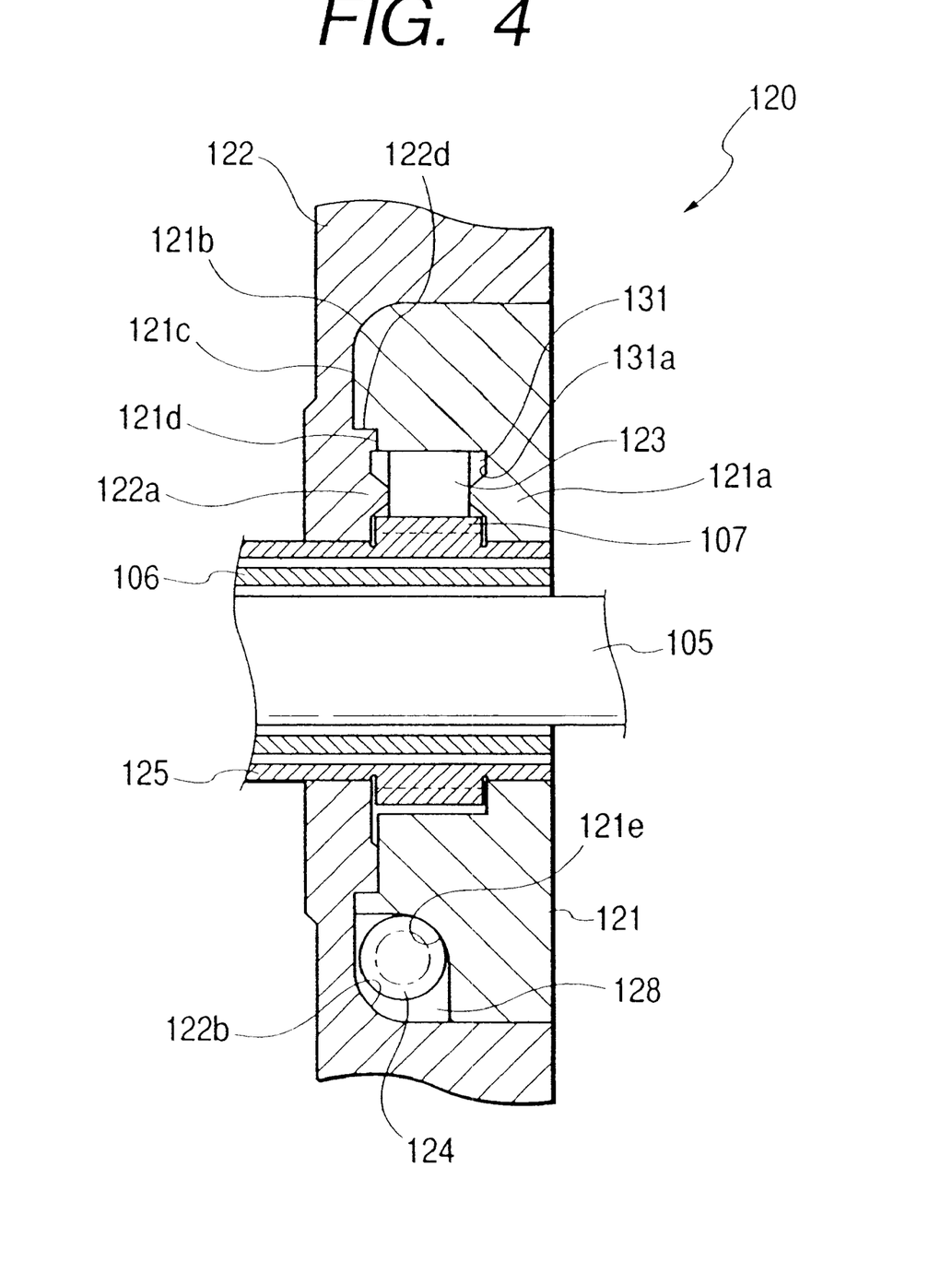
FIG. 4 is an axial partial sectional view taken along the line IV—IV in FIG. 3.

FIG. 3 is a partial fragmental, front view showing a ratchet type one-way clutch portion of FIG. 2 in detail, and FIG. 4 is an axial partial sectional view taken along the line IV—IV in FIG. 3.

As shown in FIG. 3, the one-way clutch of ratchet type includes the outer race 121 and the inner race 125 disposed in coaxial with each other, the pawls 123 and the accordion springs 126 for biasing the pawls which are disposed within the pockets provided in the inner peripheral portion of the outer race 121, and the bush 122 for axially supporting the pawls 123 and the accordion springs 126.

The cavities 128 are provided in the elements 122, 121 so that the bush 122 and the outer race 121 can be rotated relative to each other within the predetermined circumferential range, and the assembling is effected with the interposition of the coil spring 124. The shock due to the engagement can be absorbed by the coil spring 124.

The backlash of the one-way clutch of ratchet type may become great and the engaging noise may be generated. In order to prevent the engaging noise, the spring for absorbing the shock is disposed between the bush and the outer race.

FIG. 4 is a sectional view taken along the line IV—IV in FIG. 3. As explained in connection with FIG. 2, the drive shaft 105 extends laterally, and the inner race 125 is disposed in coaxial with the drive shaft with a predetermined gap therebetween. The notches 107 are provided in the outer periphery of the inner race 125, and the cylindrical member 106 is secured to the inner periphery of the inner race by spline connection and the like. Further, the outer race 121 and the bush 122 of the body portion are rotatably disposed around the outer periphery of the inner race in coaxial with the latter. A projection 121a for supporting the pawl 123 is provided on a radially extending surface 131a of each pocket 131 of the outer race 121. A projection 122a of the bush 122 is provided in a confronting relationship to the projection 121a in the axial direction, and the projections 121a, 122a support both sides of the pawl 123.

Further, a radially extending side surface 121c for defining a portion of the outer race 121 which is contacted with the bush 122 and the outer peripheral surface are connected via a curved surface 121b. Further, a concave stepped portion is provided at a lower end of the side surface 121c. On the other hand, the bush 122 is provided with a convex stepped portion 122d complementary to the stepped portion 121d. By engagement between the stepped portions 121d and 122d, a predetermined clearance is maintained between the outer race and the inner race in the radial direction.

A lower part of FIG. 4 shows a condition that the spring 124 is disposed within a cavity 128 defined by the outer race 121 and the bush 122. In the vicinity of the stepped portion 121d of the side surface 121c of the outer race 121, cut-in portions are provided equidistantly in the circumferential direction. The cut-in portions have curved surfaces 121e not to affect an influence upon expansion and contraction of the mounted spring. The cavity 128 is defied by the cut-in portions and an inner surface 122b of the bush 122, and the coil spring 124 is disposed within the cavity. With this arrangement, when the clutch is engaged, both ends of the coil spring abut against the outer race 121 and the bush 122, respectively, thereby damping the shock and suppressing the noise.

Figure 5:
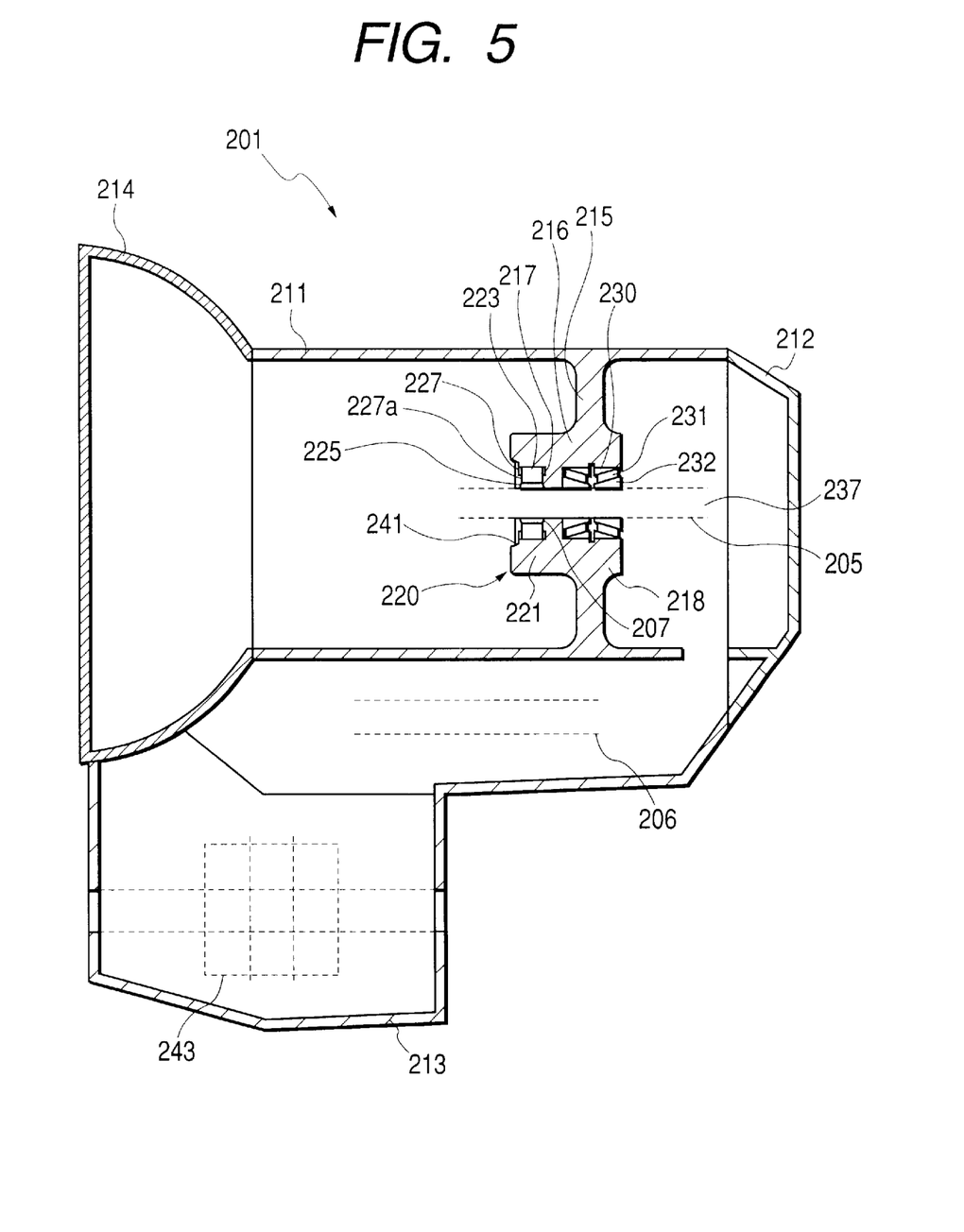
FIG. 5 is an axial sectional view of a one-way clutch according to a third embodiment of the present invention.

FIG. 5 is a partial sectional view of an automatic transmission to which a one-way clutch of ratchet type according to a third embodiment of the present invention is applied.

An automatic transmission case 201 as shown is constituted by a torque converter cover 214, a body portion 211, a rear cover 212 and a differential cover 213 for housing a differential 243.

Torque of a drive shaft 205 is transmitted to another drive shaft 206 via a gearing mechanism (not shown). The torque is further transmitted to the differential 243 via the drive shaft 206.

There is provided a support portion 215 extending radially inwardly in a direction substantially perpendicular to axial direction from a predetermined position of a cylindrical surface of the body portion 211 and contiguous to the cylindrical surface. An opening 237 through which the drive shaft 205 passes is provided at the center of the support portion 215. Further, in the vicinity of the opening 237 of the support portion 215, there is provided a holding portion 216 having an axial length greater than the remaining portion of the support portion 215.

An outer race portion 221 of a one-way clutch 220 is formed on an inner peripheral portion at one axial end portion of the holding portion 216, and the outer race portion is provided with a plurality of pockets disposed equidistantly in the circumferential direction. On the other hand, a bearing portion 218 is formed on an inner peripheral portion at the other axial end portion of the holding portion 216, and a stepped portion for holding a pair of rolling bearings 231 are extended in the circumferential direction. Thus, the inner periphery of the holding portion 216 includes the ratchet clutch and the pair of rolling bearings disposed side by side in the axial direction.

Pawls 223 as torque transmitting members and accordion springs (not shown) are disposed in the respective pockets of the outer race portion 221 acting as the outer race of the one-way clutch 220. Notches (recessed portions) 207 are provided in the inner race 225 at positions corresponding to the pockets. Further, both axial ends of the pawl 223 are axially supported by a projection 217 of the pocket and a projection 227a of a disk-shaped retainer 227.

Further, an axial outward movement of the retainer 227 is prevented by a snap spring 241. Thus, separation and dislodgment of the pawls 223 and the accordion springs (not shown) can be prevented.

On the other hand, in the bearing portion 218, rolling bearings each comprised of an outer race 230, an inner race 232 and a rolling member 231 are disposed side by side in the axial direction.

In the above-mentioned construction, similar to the first and second embodiments, when the drive shaft is rotated in one direction, the circumferential notches 207 provided in the inner race 225 arranged around the drive shaft 205 are engaged by the pawls 223, thereby transmitting torque of the inner race 225 to the outer race portion 221.

By the way, also in the third embodiment, similar to the second embodiment (refer to FIG. 4), the inner race and the drive shaft are disposed in coaxial with each other to provide a dual structure and are rotated relative to each other. Namely, although rotations of the inner race and the members secured to the inner race are limited to one direction, the drive shaft can be rotated in both directions. For clarification's sake, the members secured to the inner race are omitted from illustration.

On the other hand, when the inner race 225 is rotated in the other direction, the notches 207 are not engaged by the pawls 223, and, thus, the torque is not transmitted to the holding portion 216 as the outer race.

Incidentally, in the illustrated embodiment, while an example that the rolling bearings 232 are separately provided in the holding portion was explained, in case of a one-way clutch having a bush, the rolling bearings may be provided on the bush.

Further, in place of the rolling bearings, a portion against which the drive shaft is slid may be subjected to surface treatment to provide a sliding bearing.

Figure 6A:
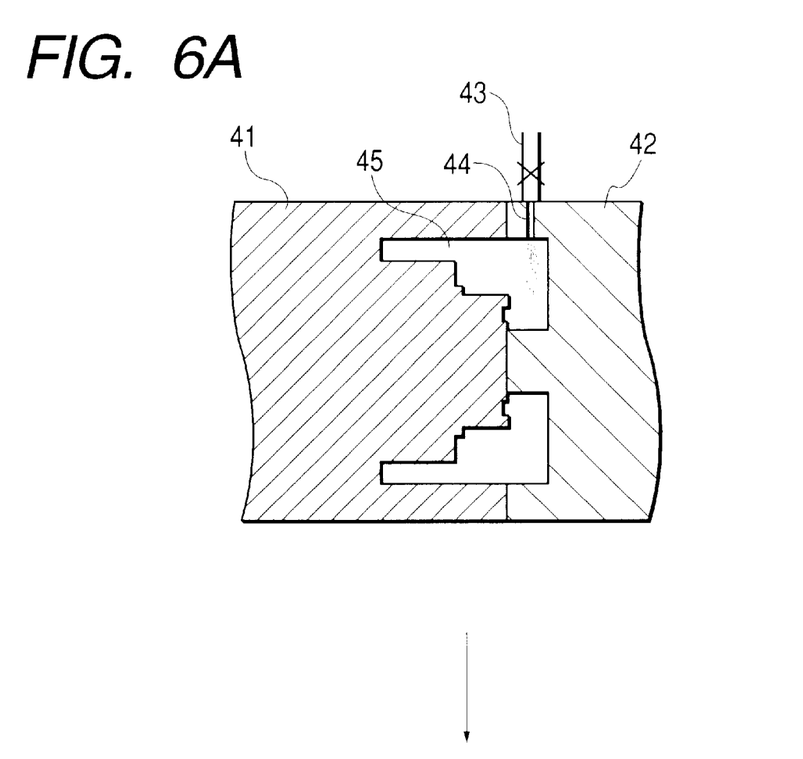
FIGS. 6A and 6B are conceptional views showing manufacturing steps for manufacturing a case body and an outer race of FIG. 1.
Figure 6B:
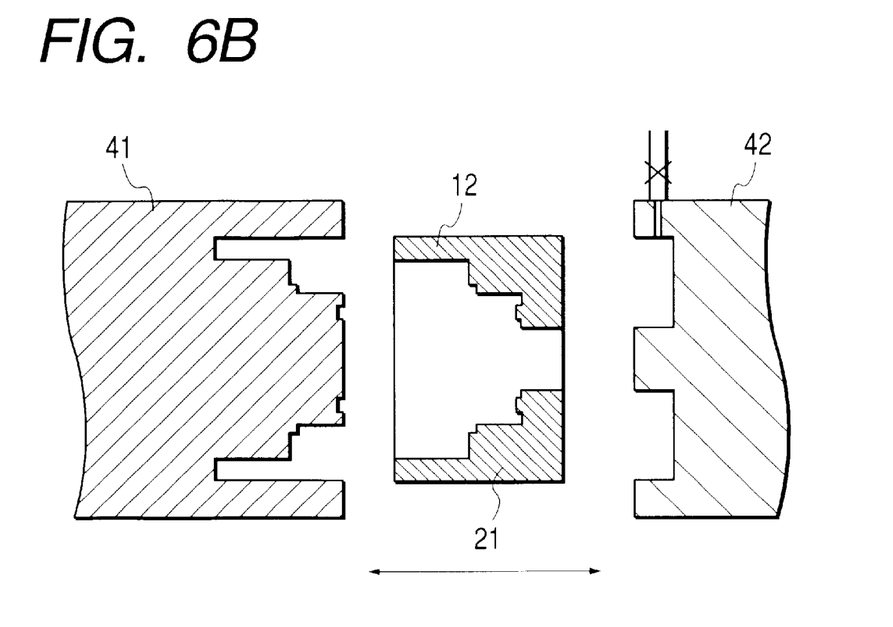

FIGS. 6A and 6B show a manufacturing method for manufacturing the extension 12 and the outer race 21 used in the one-way clutch according to the first embodiment shown in FIG. 1. In this example, die casting is used as the manufacturing method.

First of all, as shown in FIG. 6A, mold halves 41, 42 are assembled. A cavity 45 defined by assembling the mold halves 41, 42 has a configuration corresponding to those of the extension 12 and the outer race 21. The mold half 42 is provided with a through-hole 44 through which molten aluminium is supplied from a supplying device 43 into the cavity 45 defined by the assembled mold halves 41, 42 under pressure.

Thereafter, the mold halves 41, 42 and the aluminium in the cavity 45 are cooled. As shown in FIG. 6B, when the mold halves 41, 42 are separated, the extension 12 constituting the outer race 21 is formed.

In the above-mentioned embodiments, while an example that the one-way clutch is constituted by providing the notches in the inner race arranged coaxially around the outer periphery of the drive shaft was explained, the notches may be provided in the outer periphery of the drive shaft directly.

Further, while the one-way clutch of ratchet type was explained, other one-way clutch of sprag type may be used.

Incidentally, the present invention can be embodied a various aspects without departing from the gist of the invention. Thus, it should be noted that the above-mentioned embodiments are merely used for explaining the invention and do not limit the present invention.

In the one-way clutch of the present invention, it is not required that the outer race or bush be attached separately, thereby enhancing the productivity and reducing the number of parts. Thus, cost for managing the parts can be reduced, and, thus, the total cost can be reduced.

Further, by reducing the number of parts, the automatic transmission can be made compact.

By integrally die-casting the automatic transmission case and the outer race or bush integral with the case, the manufacturing steps can be simplified, thereby enhancing the productivity and reducing the cost.

According to the present invention, since the bearing portion is provided on the outer race or bush integrally formed with the case, it is not required that the bearing portion be provided separately, thereby simplifying the assembling steps and achieving reduction in weight and cost.

What is claimed is:

1. A one-way clutch for an automatic transmission, comprising:
   an inner race;
   an outer race disposed in coaxial with said inner race and rotated relative to said inner race;
   a recessed portion formed in an outer periphery of said inner race or an inner periphery of said outer race along a circumferential direction;
   a pawl engaged by said recessed portion; and
   a biasing member for biasing said pawl toward said recessed portion; and wherein
   said outer race is provided on a case of said automatic transmission.

2. A one-way clutch for an automatic transmission, comprising:
   an inner race;
   an outer race disposed in coaxial with said inner race and rotated relative to said inner race;
   a torque transmitting member disposed between said inner and outer races and adapted to transmit torque; and
   a biasing member for promoting fitting of said torque transmitting members; and wherein
   said outer race is integrally formed with a case of said automatic transmission.

3. A one-way clutch for an automatic transmission according to claim 2, wherein the one-way is a one-way clutch of ratchet type using a pawl as said torque transmitting member.

4. A one-way clutch for an automatic transmission according to claim 1, wherein said case and said outer race are integrally formed and are made of aluminium.

5. A one-way clutch for an automatic transmission according to claim 2, wherein said case and said outer race integrally formed with said case are made of aluminium.

6. A one-way clutch for an automatic transmission according to claim 1, wherein said case and said outer race are integrally formed by die casting.

7. A one-way clutch for an automatic transmission according to claim 2, wherein said case and said outer race integrally formed with said case are formed by die casting.

8. A one-way clutch for an automatic transmission according to claim 1, wherein a bearing portion is provided on said outer race.

9. A one-way clutch for an automatic transmission according to claim 2, wherein a bearing portion is provided on said outer race.

10. A one-way clutch for an automatic transmission, comprising:

an inner race;

an outer race disposed in coaxial with said inner race and rotated relative to said inner race;

a torque transmitting member disposed between said inner and outer races and adapted to transmit torque;

a biasing member for promoting fitting of said torque transmitting members; and a bush for supporting said torque transmitting member and said biasing member to provide a predetermined clearance between said inner and outer races;

and wherein said bush is integrally formed with a case of said automatic transmission.

11. A one-way clutch for an automatic transmission according to claim 10, wherein the one-way clutch is a one-way clutch of ratchet type using a pawl as said torque transmitting member.

12. A one-way clutch for an automatic transmission according to claim 10, wherein said case and said bush integrally formed with said case are made of aluminium.

13. A one-way clutch for an automatic transmission according to claim 10, wherein said case and said bush integrally formed with said case are formed by die casting.

14. A one-way clutch for an automatic transmission according to claim 12, wherein said case and said bush integrally formed with said case are formed by die casting.

15. A one-way clutch for an automatic transmission according to claim 10, wherein a bearing portion is provided on said bush.

* * * * *